US012585080B2

(12) United States Patent
Ryu et al.

(10) Patent No.: US 12,585,080 B2
(45) Date of Patent: Mar. 24, 2026

(54) CAMERA SYSTEM AND VEHICLE HAVING SAME

(71) Applicant: LG INNOTEK CO., LTD., Seoul (KR)

(72) Inventors: Yong Hak Ryu, Seoul (KR); Jin Young Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 53 days.

(21) Appl. No.: 18/692,378

(22) PCT Filed: Sep. 14, 2022

(86) PCT No.: PCT/KR2022/013742
§ 371 (c)(1),
(2) Date: Mar. 15, 2024

(87) PCT Pub. No.: WO2023/043203
PCT Pub. Date: Mar. 23, 2023

(65) Prior Publication Data
US 2024/0385411 A1      Nov. 21, 2024

(30) Foreign Application Priority Data
Sep. 15, 2021     (KR) ........................ 10-2021-0123424

(51) Int. Cl.
G02B 7/02         (2021.01)
G03B 5/00         (2021.01)
(Continued)

(52) U.S. Cl.
CPC .............. G02B 7/028 (2013.01); G03B 5/00 (2013.01); G03B 30/00 (2021.01); H04N 23/52 (2023.01); G03B 2205/0069 (2013.01)

(58) Field of Classification Search
CPC ........ H04N 23/52; H04N 23/54; H04N 23/55; H04N 23/57; H02K 41/0356; G03B 5/00;
(Continued)

(56) References Cited

U.S. PATENT DOCUMENTS 6,144,805 A       11/2000   Ogino
2017/0052341 A1*    2/2017   Wong ....................... G01K 7/16
(Continued)

FOREIGN PATENT DOCUMENTS

EP          0 694 799 A2      1/1996
JP          2018-63416 A       4/2018
(Continued)

OTHER PUBLICATIONS

International Search Report dated Dec. 21, 2022 in International Application No. PCT/KR2022/013742.
(Continued)

*Primary Examiner* — Kelly L Jerabek
(74) *Attorney, Agent, or Firm* — Saliwanchik, Lloyd & Eisenschenk

(57) ABSTRACT

A camera system disclosed in an embodiment of the invention includes a camera module having an image sensor, a first lens holder having at least one lens, a second lens holder disposed between the image sensor and the first lens holder and having a first lens adjacent to the image sensor, and a driving portion that moves the second lens holder in the optical axis direction; a temperature sensor that detects a ambient temperature of the camera module; a storage portion storing a correction rate of an optical axis distance between the first lens and the image sensor according to the ambient temperature; a temperature compensation portion that drives the driving portion using the ambient temperature and a correction rate of the storage portion to adjust the optical axis distance between the first lens and the image sensor.

20 Claims, 8 Drawing Sheets

(51) Int. Cl.
 *G03B 30/00* (2021.01)
 *H04N 23/52* (2023.01)
(58) Field of Classification Search
 CPC . G03B 30/00; G03B 2205/0069; G02B 7/028
 See application file for complete search history.

(56) References Cited

U.S. PATENT DOCUMENTS

| | | | | |
|---|---|---|---|---|
| 2018/0217352 A1* | 8/2018 | Kamba | | H04N 23/673 |
| 2018/0292670 A1 | 10/2018 | Takahashi et al. | | |
| 2019/0196140 A1* | 6/2019 | Kajimura | | G02B 7/08 |
| 2019/0250382 A1* | 8/2019 | Lee | | H04N 23/55 |
| 2022/0146716 A1* | 5/2022 | Uetsuji | | H04N 23/55 |

FOREIGN PATENT DOCUMENTS

| | | | |
|---|---|---|---|
| JP | 2019-201262 | A | 11/2019 |
| JP | 2021-51196 | A | 4/2021 |
| JP | 2021-107934 | A | 7/2021 |
| KR | 10-2004-0107560 | A | 12/2004 |
| KR | 10-0919118 | B1 | 9/2009 |
| KR | 10-2016-0110126 | A | 9/2016 |
| KR | 10-2020-0009692 | A | 1/2020 |

OTHER PUBLICATIONS

Supplementary European Search Report dated Aug. 19, 2025 in European Application No. 22870287.4.

* cited by examiner

| Example | Temperature range | Reference temperature | Temperature correction rate for each section |
|---|---|---|---|
| Status 1 | -50℃~-30℃ | -40℃ | 5% ~ 14.3% |
| Status 2 | -30℃~-10℃ | -20℃ | 3.3% ~ 9.5% |
| Status 3 | -10℃~+10℃ | 0℃ | 1.7% ~ 4.8% |
| Status 4 | +10℃~+30℃ | 20℃ | 0% (Ref. BFL) |
| Status 5 | +30℃~+50℃ | 40℃ | 1.3% ~ 3.6% |
| Status 6 | +50℃~+70℃ | 60℃ | 2.5% ~ 7.2% |
| Status 7 | +70℃~+90℃ | 80℃ | 3.8% ~ 10.7% |
| Status 8 | +90℃~+110℃ | 100℃ | 5% ~ 14.3% |

CAMERA SYSTEM AND VEHICLE HAVING SAME

CROSS-REFERENCE TO RELATED APPLICATIONS

This application is the U.S. national stage application of International Patent Application No. PCT/KR2022/013742, filed Sep. 14, 2022, which claims the benefit under 35 U.S.C. § 119 of Korean Application No. 10-2021-0123424, filed Sep. 15, 2021, the disclosures of each of which are incorporated herein by reference in their entirety.

TECHNICAL FIELD

An embodiment of the invention relates to camera systems and vehicles having the same.

BACKGROUND ART

Recently, research on detection systems that detect the surroundings of the vehicle for driving portion safety and convenience is accelerating. Vehicle detection systems are used for various purposes, such as detecting objects around the vehicle to inhibit collisions with objects that the driving portion does not recognize, as well as performing automatic parking by detecting empty spaces, and provide the most essential data for automatic vehicle control. Such the detection system uses a method of using a radar signal and a method of using a camera are commonly used. The vehicle camera module is built-in and used in front and rear surveillance cameras and black boxes in a vehicle, and takes a picture or video of the subject. Since the vehicle camera module is exposed to the outside, photographing quality may deteriorate due to moisture and temperature. In particular, camera modules have a problem in that their optical characteristics change depending on the ambient temperature and the material of the lens.

DISCLOSURE

Technical Problem

An embodiment of the invention may provide a camera system that may predict and compensate for changes in the focal length of a lens within a camera module.

An embodiment of the invention may provide a camera system that may predict temperature changes in at least one lens in a camera module and adjust the optical axis distance.

An embodiment of the invention may provide a control system for controlling a camera module applied to a device or structure with large temperature changes.

Technical Solution

A camera system according to an embodiment of the invention may include a camera module having an image sensor, a first lens holder having at least one lens, a second lens holder disposed between the image sensor and the first lens holder and having a first lens adjacent to the image sensor, and a driving portion that moves the second lens holder in the optical axis direction; a temperature sensor that detects a ambient temperature of the camera module; a storage portion storing a correction rate of an optical axis distance between the first lens and the image sensor according to the ambient temperature; a temperature compensation portion that drives the driving portion using the ambient temperature and a correction rate of the storage portion to adjust the optical axis distance between the first lens and the image sensor.

A camera system according to an embodiment of the invention may include a camera module having a first lens holder having a plurality of lenses, a main substrate, an image sensor disposed on the main substrate, and a driving portion that moves the main substrate in an optical axis direction; a temperature sensor that detects an ambient temperature of the camera module; a storage portion storing a correction rate of an optical axis distance between the image sensor and a first lens adjacent to the image sensor among the plurality of lenses according to ambient temperature; a temperature compensation portion that drives the driving portion using the ambient temperature and the correction rate of the storage portion to adjust the optical axis distance between the first lens and the image sensor.

According to an embodiment of the invention, the driving portion may include a plurality of actuators having opposing coils and magnets. The camera module includes a cover glass between the image sensor and the plurality of lenses; an optical filter between the cover glass and the plurality of lenses; and a housing disposed outside the image sensor, wherein the coil of the driving portion may be coupled to the housing.

According to an embodiment of the invention, when the temperature is detected to be lower than a reference temperature, the temperature compensator may drive the driving portion to correct the optical axis distance between the first lens and the image sensor to decrease. When the temperature is detected to be higher than a reference temperature, the temperature compensator may drive the driving portion to correct the optical axis distance between the first lens and the image sensor to increase.

According to an embodiment of the invention, a position of a mover of the driving portion may be moved by 0.1 mm in an object-side direction or 0.1 mm in a sensor-side direction from the reference position by the temperature compensation portion.

According to an embodiment of the invention, the distance between the first lens and the image sensor is BFL, the distance between an object-side surface of the lens closest to the subject and the image sensor within the camera module is TTL, and the BFL may change within a range of 10% to 22% of the TTL according to the detected temperature change.

According to an embodiment of the invention, the correction rate may be corrected in the object-side direction or the sensor-side direction in a range of 5% to 14.3% from the reference BFL.

According to an embodiment of the invention, the detected temperature ranges from a minimum of −40 degrees to a maximum of 100 degrees, and the reference BFL may be the optical axis distance at a reference temperature of 20±10 degrees. The reference BFL ranges from 0.7 mm to 2 mm, and the temperature compensation portion may move the first lens by 0.1 mm in the object-side direction or 0.1 mm in the sensor-side direction when the temperature changes from the reference temperature to the minimum or maximum temperature.

Advantageous Effects

According to an embodiment of the invention, it is possible to compensate for a change in back focal length (BFL) within a camera module. Additionally, by moving at least one lens in the direction of the optical axis according to temperature changes, changes in performance may be minimized. Additionally, by detecting ambient temperature information of the camera module from the inside or outside of the vehicle, the distance between at least one lens and the sensor may be adjusted within a predictable range for each temperature. Accordingly, changes in performance depending on the temperature of the camera module may be minimized.

An embodiment of the invention may improve the reliability of a system having a camera module and a vehicle having the same.

BEST MODE

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and)

B, C is stated, it may include one or more of all combinations that may be combined with A, B, and C.

In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

Additionally, several embodiments described below may be combined with each other, unless specifically stated that they cannot be combined with each other. Additionally, unless specifically mentioned, parts omitted from the description of one of several embodiments may be applied to the description of other embodiments.

Figure 1:
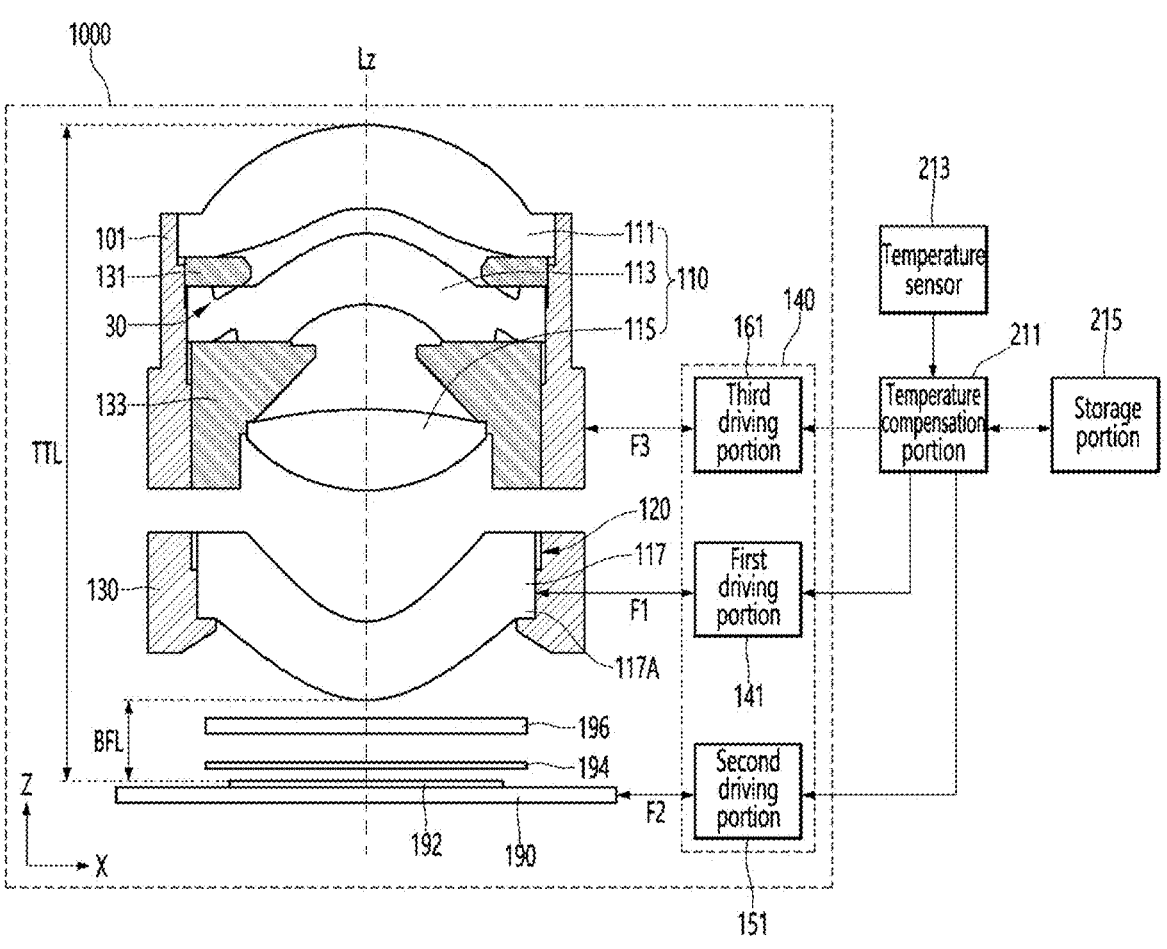
FIG. 1 is a diagram showing a camera system according to an embodiment of the invention.
Figures 2A, 2B:
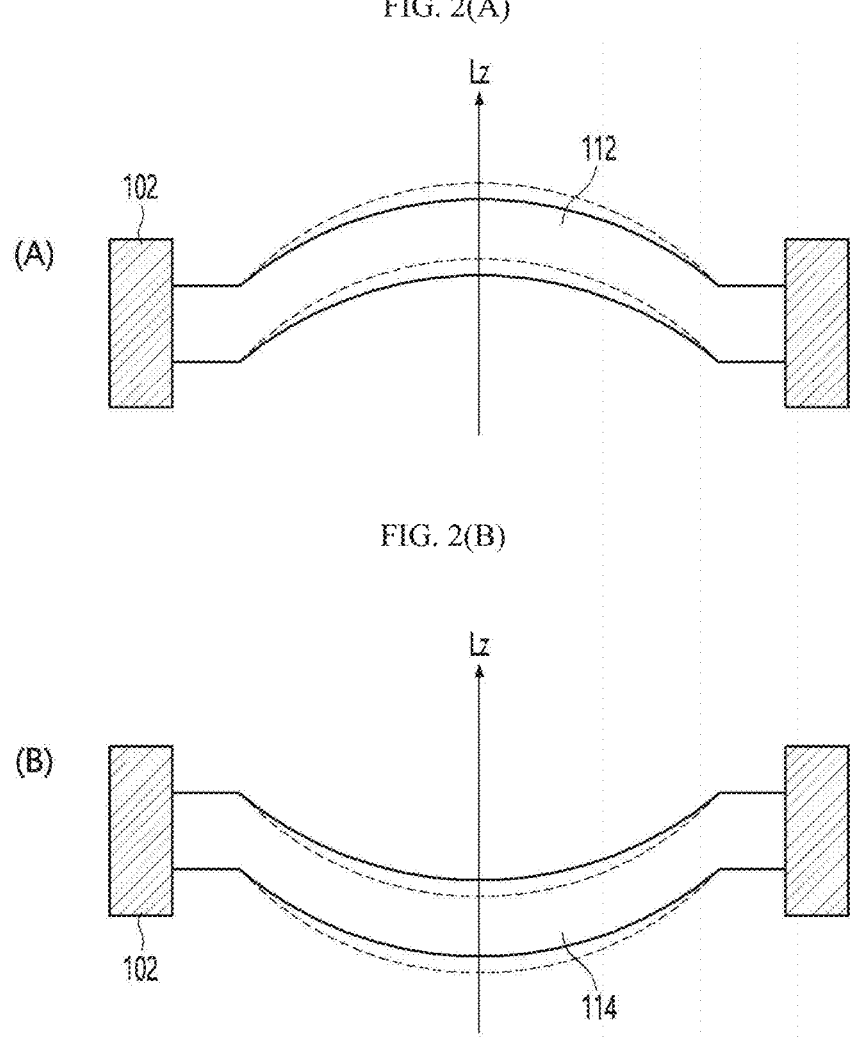
FIGS. 2(A) and 2(B) are diagrams illustrating changes of the focal length of a lens according to temperature within a camera module.
Figure 3:
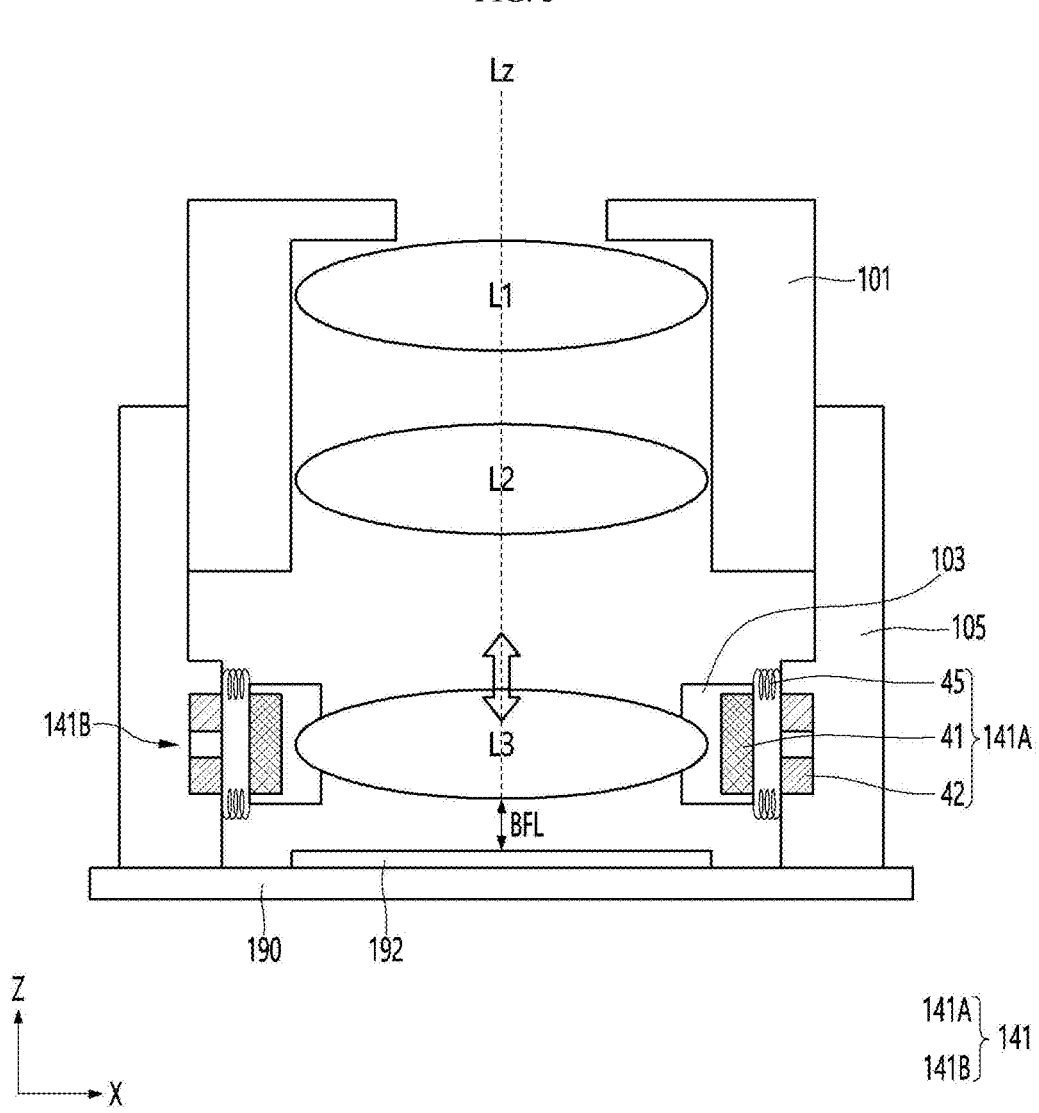
FIG. 3 is a side cross-sectional view showing a first example of a camera module in the camera system of FIG. 1.
Figure 4:
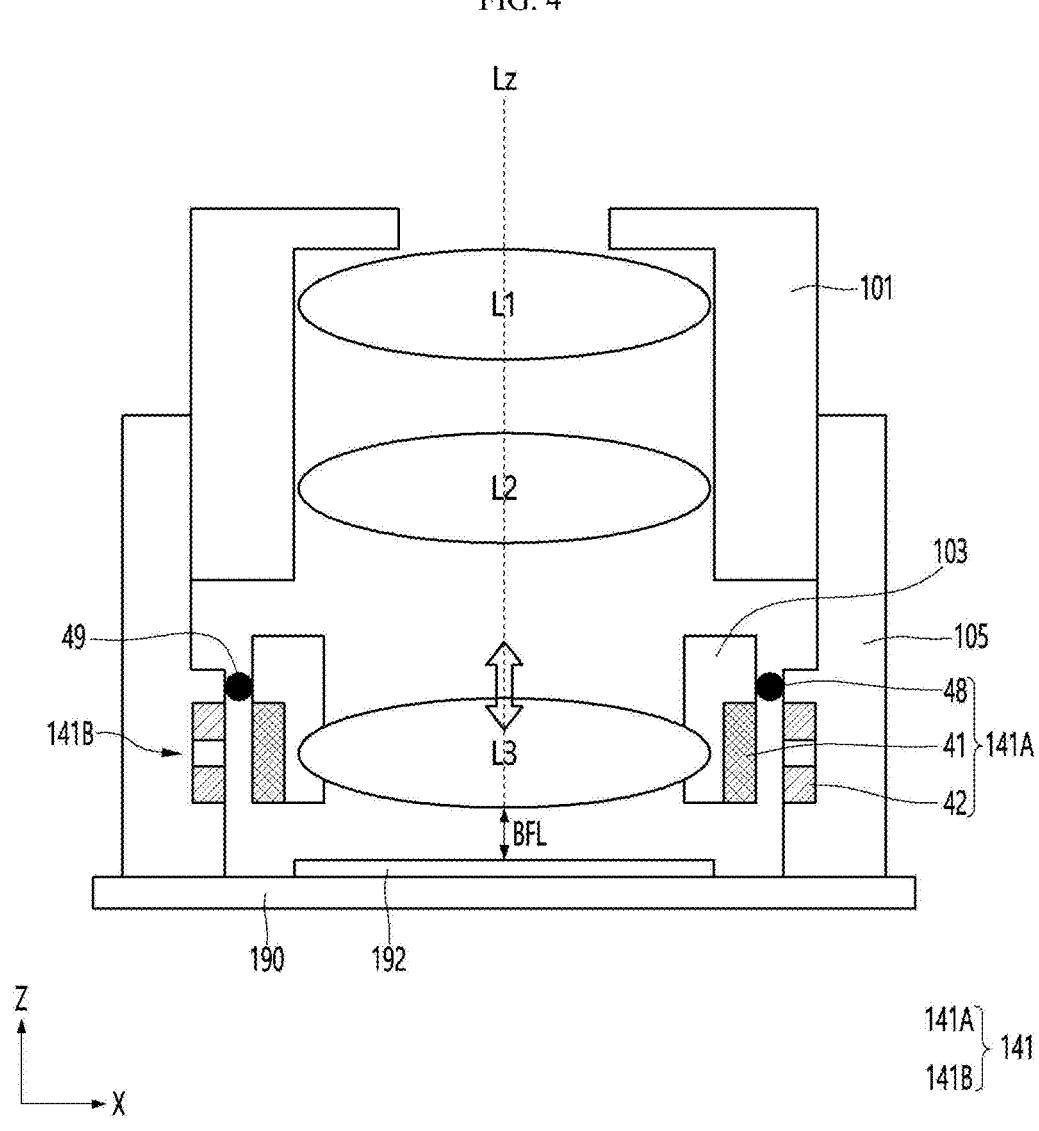
FIG. 4 is a side cross-sectional view showing a second example of a camera module in the camera system of FIG. 1.
Figure 5:
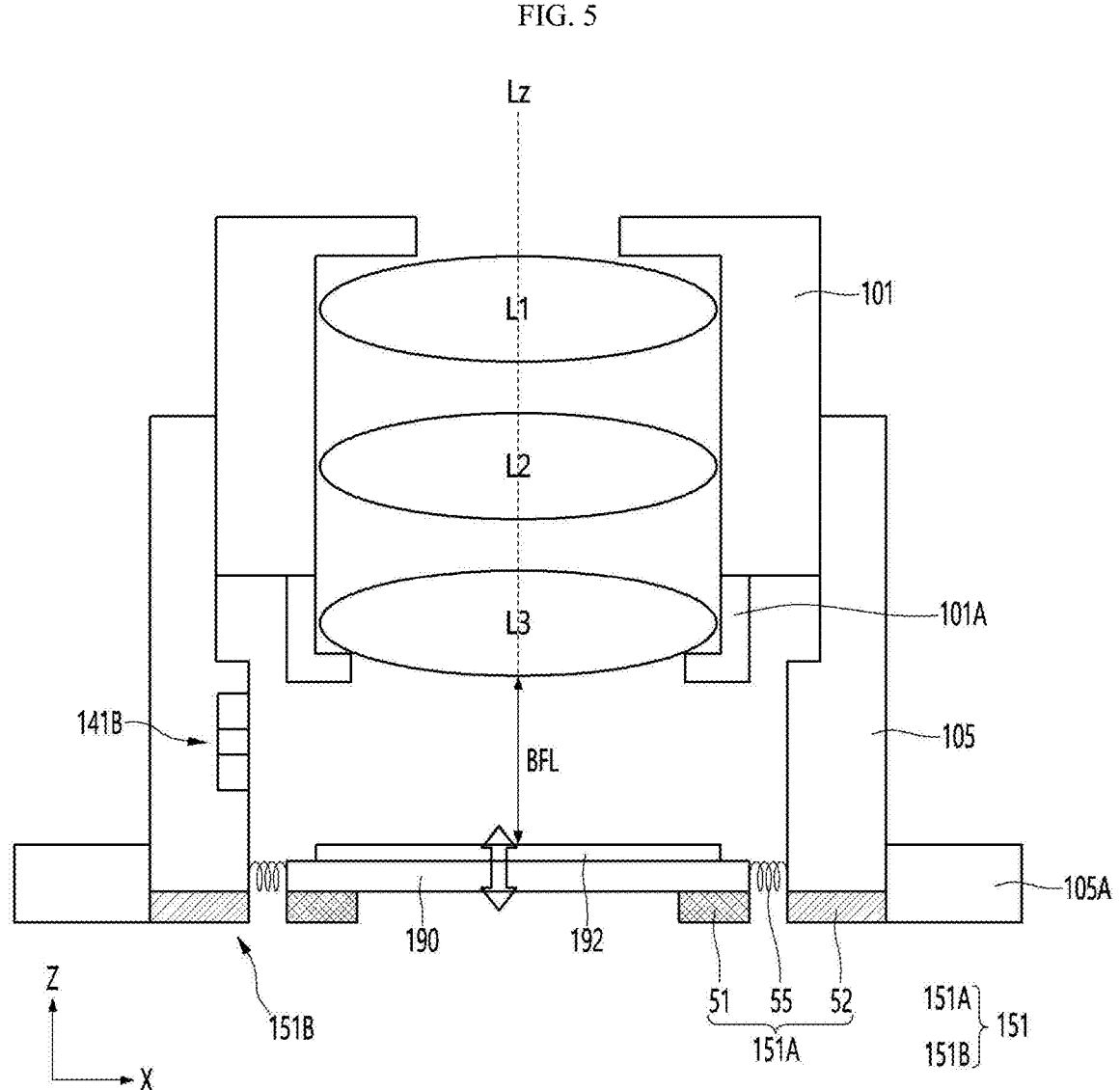
FIG. 5 is a side cross-sectional view showing a third example of a camera module in the camera system of FIG. 1.
Figures 6, 7:
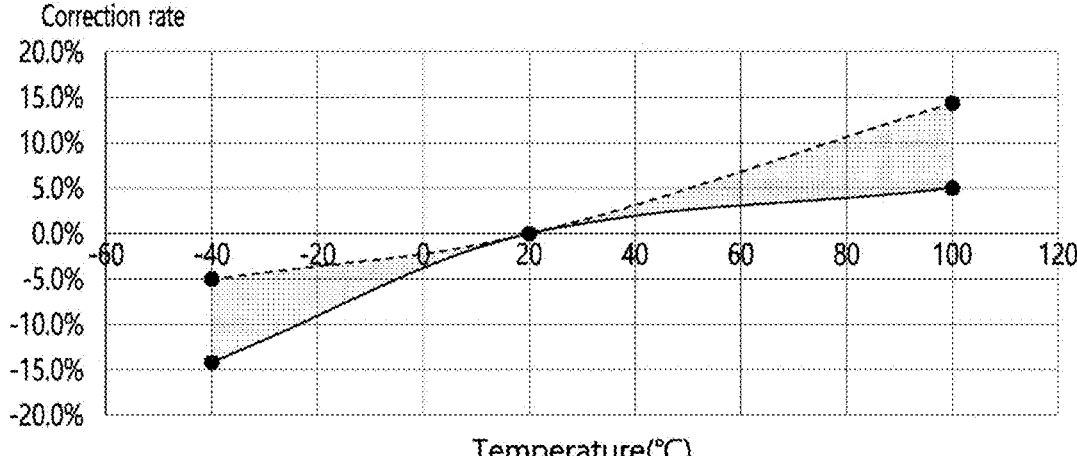
FIG. 6 is a table showing lens correction rates according to temperature stored in the storage portion of the camera system of FIG. 1.
FIG. 7 is a graph showing the lens correction rate according to temperature in the camera system of FIG. 1.
Figure 8:
FIG. 8 is a diagram showing a table showing the temperature compensation rate according to the reference BFL stored in the storage portion of the camera system according to an embodiment of the invention.

FIG. 1 is a diagram showing a camera system according to an embodiment of the invention, FIGS. 2(A) and 2(B) are diagrams illustrating changes of the focal length of a lens according to temperature within a camera module, FIG. 3 is a side cross-sectional view showing a first example of a camera module in the camera system of FIG. 1, FIG. 4 is a side cross-sectional view showing a second example of a camera module in the camera system of FIG. 1, FIG. 5 is a side cross-sectional view showing a third example of a camera module in the camera system of FIG. 1, FIG. 6 is a table showing lens correction rates according to temperature stored in the storage portion of the camera system of FIG. 1, FIG. 7 is a graph showing the lens correction rate according to temperature in the camera system of FIG. 1, and FIG. 8 is a diagram showing a table showing the temperature compensation rate according to the reference BFL stored in the storage portion of the camera system according to an embodiment of the invention.

Referring to FIG. 1, a camera system according to an embodiment of the invention may include a camera module 1000, a temperature compensation portion 211 that provides a driving signal to the camera module 1000, a temperature sensor 213 for detecting the ambient temperature of the camera module 1000, and a storage portion 215 in which a compensation rate according to the temperature change is stored.

The camera module 1000 may include a first lens holder 101 having a plurality of lenses 111, 112, and 115, a second lens holder 103 having at least one lens 117, a main substrate 190, and an image sensor 192. The camera module 1000 may include a cover glass 194 or/and an optical filter 196 between the image sensor 192 and the lens 117 closest to the sensor.

The camera module 1000 may include a driving portion 140 for driving at least one or more of the lens 117 of the second lens holder 103, one lens of the first lens holder 101, and the main substrate 190. The driving portion 140 may be implemented as a first driving portion 141 that moves one lens of the second lens holder 103 in the optical axis Lz direction. As another example, the driving portion 140 may be implemented as a second driving portion 151 that moves the main substrate 190 in the direction of the optical axis Lz. As another example, the driving portion 140 may be implemented as a third driving portion 161 that moves one lens of the first lens holder 101 in the optical axis Lz direction. The driving portion 140 may be implemented as a single driving portion, but as another example, it may be implemented as two or more driving portions, for example, first and second driving portions 141 and 151, or first and third driving portions 141 and 161, or may be implemented as second and third driving portions 151 and 161.

The driving portion 140 according to an embodiment of the invention may include at least one or more actuators having a mover and a stator. The actuator may be driven by a VCM (Voice coil motor) type with a magnet and a coil, may further include a supporting member, and a yoke or/and a hall sensor may be disposed outside the magnet. The coil and magnet may be arranged to face each other on the outside of each holder or lens. When power is applied to the coil, the magnet may move in the object-side direction or in the sensor-side direction together with the lens holders 101 and 103 or the main substrate 190 due to electromagnetic influence between each magnet and the coil. At least one of the first to third driving portions 141, 15, and 161 may include a piezoelectric device.

The lenses 111, 113, and 115 coupled within the first lens holder 101 may be defined as the first lens group 110, and the lenses 117 coupled within the second lens holder 103 may be defined as the second lens group 120. The first lens group 110 may include two or more lenses, or two to eight lenses may be stacked within the first lens group 110. The second lens group 120 has a smaller number of lenses than the number of lenses of the first lens group 110, and one, two, or three lenses may be stacked within the second lens group 120.

The camera module 1000 may have a plurality of lenses 111, 113, 115, and 117 stacked along the optical axis Lz from the object side to the sensor side, for example, a first lens 111, a second lens 113, a third lens 115 and the fourth lens 117 may be stacked. The first lens 111 may be the lens closest to the object or a first lens. The fourth lens 117 may be defined as the lens closest to the sensor or the last lens.

The camera module 1000 may have at least three lenses stacked, for example, three to eleven lenses or three to five lenses. The camera module 1000 may include at least three solid lenses, and the solid lenses may include at least one plastic lens and at least one glass lens.

The camera module 1000 may be used by mixing plastic lenses and glass lenses. When using a plastic lens in a vehicle, the price may be lower compared to a glass lens, and light path control may be facilitated by providing an aspherical surface on the entrance and exit sides. Here, the coefficient of thermal expansion (CTE) of the plastic material is more than 5 times higher than that of the glass material, and the change value of the refractive index as a function of temperature may be more than 10 times lower for the plastic material than for the glass material. In cases where the rate of expansion and contraction depending on temperature is large, such as a plastic lens, the plastic lenses 112 and 114 may expand or contract according to temperature changes, as shown in FIGS. 2(A) and 2(B), for example, when the object-side surface is convex and/or the sensor-side surface is concave, as shown in FIG. 2(A), it may expand in the direction of the object, and when the object-side surface is concave, as shown in FIG. 2(B), or/And when the sensor-side surface is convex, it may expand in the sensor side direction. The positions of the entrance and exit sides of these lenses 112 and 114 or the height of the optical axis Lz may be different. Accordingly, the optical properties of the lenses 112 and 114 may be affected depending on temperature changes.

The camera module 1000 according to an embodiment of the invention may have one or two or more lenses made of plastic. The first lens 111 of the first lens group 110 may be made of glass, and one or both of the second and third lenses 113 and 115 may be made of plastic. The fourth lens 117 of the second lens group 120 may be made of plastic or glass. The second lens group 120 may be provided with a weight of up to 0.6 g or less, for example, 0.2 g to 0.6 g or 0.5 g to 0.6 g for optical axis Lz correction and temperature correction. when the weight of the second lens group 120 exceeds 0.6 g, there is a problem that when the back focal length BFL changes depending on temperature, it cannot be adjusted to a constant reference BFL.

The first lens holder 101 may be made of plastic or metal for heat dissipation efficiency. The second lens holder 103 may be made of plastic or metal for heat dissipation efficiency. When the lens holders 101 and 103 are made of metal, the lens holders 101 and 103 may improve the heat dissipation effect of the camera module 1000, or when the lens holders 101 and 103 are made of the same material as the plastic lens, the lens holders 101 and 103 may reduce the difference in thermal expansion coefficient. The metal material may be selected from, for example, Al, Ag, or Cu, and may be Al or Al alloy. A hydrophilic material may be coated or applied to the surfaces of the first and second lens holders 101 and 103. In an embodiment of the invention, in order to compensate for BFL, the material of the second lens holder 103 may be metal.

Each of the lenses 111, 113, 115, and 117 may include an effective region having an effective diameter through which light is incident, and a flange that is a non-effective region outside the effective region. The non-effective region may be a region where light is blocked by the light blocking films 131 and 133. The flanges may extend in a circumferential direction about the optical axis Lz in the effective regions of the lenses 111, 113, 115, and 117. Among the lenses 111, 113, 115, and 117, at least one 115 may have no flange portion or may be provided with a relatively short length. The fourth lens 117 may have a flange 117A on its outer circumference and be coupled to the inside of the second lens holder 130.

The first lens 111 is the lens closest to the subject, and at least one or both of the first surface on the object side from which light is incident and the second surface on the sensor side from which light is emitted may be spherical or aspherical. The first or second surface of the first lens 111 may be concave or convex. The first lens 111 may be made of plastic to inhibit discoloration when the camera module 1000 is exposed to light from inside or outside the vehicle of the vehicle, and may be made of a glass material or plastic material when the camera module 1000 is disposed inside the vehicle. The second lens 113 may be made of plastic. The second lens 113 is disposed between the first lens 111 and the third lens 115, and the third lens 115 may be made of glass or plastic. The fourth lens 117 is the lens closest to the image sensor 192 and may be made of glass or plastic.

On the optical axis Lz, the second lens 113 may have a convex object-side surface and a concave sensor-side surface, and the third lens 115 may have a convex object-side surface and a convex sensor-side surface, and the fourth lens 117 may have a concave object-side surface and a convex (or concave) sensor-side surface. As another example, the object-side surface/sensor-side surface of the second lens 113 may be concave/convex, convex/convex, or concave/concave. As another example, the object-side surface/sensor-side surface of the third lens 115 may be concave/convex, convex/concave, or concave/concave. The object-side surface and/or sensor-side surface of the second lens 113, third lens 115, and fourth lens 117 may be spherical or aspherical, but are not limited thereto.

The first light blocking film 131 and the second light blocking film 133 may be made of the same material or different materials, for example, a material that absorbs light. The first and/or second light blocking films 131 and 133 may include a poly ethylene film (PE film) or a polyester (PET) film. As another example, the first and/or second light blocking films 131 and 133 may be made of metal or alloy and an oxide film may be formed on their surfaces. Material included in the metal or alloy may include at least one of In, Ga, Zn, Sn, Al, Ca, Sr, Ba, W, U, Ni, Cu, Hg, Pb, Bi, Si, Ta, H, Fe, Co, Cr, Mn, Be, B, Mg, Nb, Mo, Cd, Sn, Zr, Sc, Ti, V, Eu, Gd, Er, Lu, Yb, Ru, Y and La. The oxide film may be an oxidized material treated with black oxide or brown oxide using copper.

The image sensor 192 may be disposed on the main substrate 190. The image sensor 192 may be mounted, seated, contacted, fixed, temporarily fixed, supported, or coupled to the main substrate 190 on a plane intersecting the optical axis Lz. Alternatively, according to another embodiment, a groove (not shown) capable of accommodating the image sensor 192 may be formed in the main substrate 190, and in the embodiment, the configuration is not limited to a specific configuration in which the image sensor 192 is disposed on the main substrate 190. The main substrate 190 may be a rigid PCB or an FPCB.

The image sensor 192 may perform a function of converting incident light into image data. A sensor holder is disposed at the bottom of the housing 500 to surround the image sensor 192 and protect the image sensor 192 from external foreign substances or impacts. The image sensor 192 may be one of a charge coupled device (CCD), complementary metal-oxide semiconductor (CMOS), CPD, or CID. When there are multiple image sensors 192, one may be a color (RGB) sensor and the other may be a black-and-white sensor.

The optical filter 196 may be disposed between the fourth lens 117, which is the last lens, and the image sensor 192. The optical filter 196 may filter light corresponding to a specific wavelength range for light passing through the lenses 111, 113, 115, and 117. The optical filter 196 may be an infrared (IR) blocking filter that blocks infrared rays or an ultraviolet (UV) blocking filter that blocks ultraviolet rays, but the embodiment is not limited thereto. The optical filter 196 may be disposed on the image sensor 192.

The cover glass 194 is disposed between the optical filter 196 and the image sensor 196, protects the upper part of the image sensor 196, and may inhibit the reliability of the image sensor 196 from deteriorating.

The camera module 1000 may further have a housing (not shown) coupled to the outside of the lens holders 101 and 103. The camera module 1000 may include a driving member (not shown), the driving member may move or tilt the holder having at least one of the lenses in a direction orthogonal to the optical axis Lz direction and/or the optical axis Lz direction. The camera module 1000 may include an auto focus (AF) function or/and an optical image stabilizer (OIS) function.

The temperature sensor 213 may detect the ambient temperature of the camera module 1000. The detected temperature may detect the temperature inside or outside the camera module 1000 and may be detected in the range of −50 degrees to 125 degrees. The camera module 1000 may be applied to a moving object such as a vehicle, airplane, ship, or portable terminal. For example, in the case of a vehicle, the temperature difference may be large due to the external environment. The reference temperature at this time may be the temperature inside the vehicle.

The temperature compensation portion 211 controls the driving mode of the driving portion(s) based on the temperature detected from the temperature sensor 213. The storage portion 215 may match and store the detected temperature and a temperature correction rate according to the temperature.

For example, as shown in FIG. 6, the temperature correction rate for each section is based on the reference temperature, a first mode (Status 1-3) for compensating when the temperature is lower than the reference (Ref) temperature, and a second mode (Status 5-8) for compensating when the temperature is higher than the reference (Ref) temperature. The reference (Ref) temperature may be room temperature, for example, in the range of 10 to 30 degrees or 15 to 25 degrees, and preferably 20 degrees±10 degrees. The first mode (Status 1-3) is a temperature lower than the reference (Ref) temperature, and the temperature for each section may be divided into at least 3 sections ranging from 10 degrees to −50 degrees, and the first section (Status 1) ranges from 10 to −10 degrees, the second section (Status 2) may range from −10 degrees to −30 degrees, and the third section (Status 3) may range from −30 degrees to −50 degrees. The reference temperature for each section of the first to third sections (Status 1-3) may be 0 degrees, −20 degrees, and −40 degrees, and the temperature deviation for each section may be ±10 degrees. The second mode is a temperature higher than the reference (Ref) temperature, and the temperature for each section may be divided into at least 4 sections ranging from 30 degrees to 100 degrees. Looking at the temperature for each section, the first section (Status 5) may range from 30 to 50 degrees, the second section (Status 6) may range from 50 to 70 degrees, the third section (Status 7) may range from 70 to 90 degrees, and the fourth section (Status 8) may range from 90 degrees to 110 degrees. The reference temperature for each section of the first to fourth sections (Status 5-8) may be 40 degrees, 60 degrees, 80 degrees, and 100 degrees, and the temperature deviation for each section may be ±10 degrees.

In another example of the invention, the temperature correction rate for each section may be corrected by the average temperature change in each section (Status 1-8). For example, in the first section (Status 1) lower than the reference temperature, the temperature correction rate may be set to the average value of the temperature correction rate of 10 degrees and the temperature correction rate of −10 degrees, and in this way, in this way, an average temperature correction rate of each of the second to third sections lower than the reference temperature may be set. In addition, in the first section (Status 5), which is higher than the reference temperature, the temperature correction rate of the section may be set as the average value of the temperature correction rate of 30 degrees and the temperature correction rate of 50 degrees, and in this way, it may be corrected with an average temperature correction rate of each of the second to fourth sections higher than the reference temperature.

In another example of the invention, the calculation of the average temperature correction rate may add weight to the correction rate at a relatively low temperature in each section lower than the reference, and may add weight to the correction rate at a relatively high temperature in each section higher than the reference. For example, in the first section (Status 1), 30% of the temperature correction rate of 10 degrees is weighted, 70% of the temperature correction rate is weighted to the temperature correction rate of −10 degrees, and the temperature correction rate is set with these average values, and in this way, the average temperature correction rate may be set to which the weights of each of the second to third sections lower than the reference temperature are added. In addition, in the first section (Status 5), which is higher than the reference temperature, a 30% weight is given to the temperature correction rate of 30 degrees, and an additional 70% weight is given to the temperature correction rate of 50 degrees, and the temperature correction rate of the section may be set by these average values, and in this way, it may be corrected with the average temperature correction rate for each of the second to fourth sections that are higher than the reference temperature.

The temperature compensation portion 211 may determine a driving mode with a matching temperature by comparing the reference mode stored in the storage portion 215, the temperature correction rate for each section (Status 1-3) of the first mode, and the temperature correction rate for each section (Status 1-3) of the second mode based on the detected temperature. Alternatively, the temperature compensation portion 211 may control the position of the BFL based on the average temperature compensation rate for each section. Alternatively, the temperature compensation portion 211 may control the position of the BFL based on the average temperature compensation rate for each section.

The temperature compensation portion 211 may control at least one driving portion 141, 151, and 161 according to the driving mode. For example, when driving the first driving portion 141 by the first control signal F1, the optical axis Lz distance between the sensor side of the fourth lens 117 and the image sensor 192, that is, BFL (Back focal length) may be increased or decreased. Preferably, the fourth lens 117 contracts or expands according to temperature changes, so that the reference BFL may be decreased or increased.

At this time, when the temperature compensation portion 211 is in a section of the first mode where the detected temperature is lower than the reference temperature, the fourth lens 117 may be contracted, and as a result, the BFL may be increased than the reference value. In addition, the temperature compensation portion 211 may control the driving portions 141 and 151 to decrease the BFL according to the temperature compensation rate of the BFL. Conversely, when the temperature compensation portion 211 is in a section of the second mode where the detected temperature is higher than the reference temperature, the fourth lens 117 may expand, and as a result, the BFL may be reduced from the reference value. The temperature compensation portion 211 may control the driving portions 141 and 151 to increase the BFL according to the temperature compensation rate of the BFL.

The temperature compensation portion 211 may move the mover within a range of ±0.2 mm in the direction of the optical axis Lz in the first and second modes. In addition, the amount of change in BFL due to the temperature change is at least ±20 μm, and may be up to ±100 μm. Additionally, the temperature correction rate may be corrected from a minimum of 5% to a maximum of 14.3% at the lowest temperature, and from a minimum of 5% to a maximum of 14.3% at the highest temperature.

The temperature correction rate for each section may be expressed by Equation 1 below.

$$\text{Temperature correction rate} = \text{Abs}\{((\text{reference BFL}) - (\text{corrected driving portion position}))/(\text{reference BFL}) \times 100\} \quad \text{Equation 1}$$

The Abs is an absolute value, and the corrected driving portion position is the optical axis distance obtained by measuring the position of the mover of the first driving portion 141 from the image sensor. The value of (reference BFL)−(corrected driving portion position) may be a correction amount.

When the first control signal F1 is input, the first driving portion 141 may move the fourth lens 117 up or down in the direction of the optical axis Lz. When the second control signal F2 is input, the second driving portion 151 may move the main substrate 190 up or down in the direction of the optical axis Lz. When the third control signal F3 is input, the third driving portion 161 may move the first lens holder 101 or any of the internal lenses 111, 113, and 115 up or down in the direction of the optical axis Lz. Here, when the third driving portion 161 is driven, the change in TTL (Total Track Length) of the camera module 1000 may be adjusted according to temperature changes, or TTL may be reduced or increased according to the BFL change. TTL is the optical axis Lz distance from the object-side surface of the first lens 111 to the image sensor 192.

The camera system according to an embodiment of the invention can inhibit_a decrease in resolution or performance by compensating for changes in BFL within the camera module 1000 due to temperature changes by temperature. Additionally, by controlling movement in the direction of the optical axis Lz, the distance to the optical axis Lz may be controlled according to temperature changes in the entire optical system. In addition, the camera module 1000 may correct AF or/and an optical image stabilizer (OIS) by moving the first lens holder 101 or the second lens holder 103 in at least one or two directions orthogonal to the optical axis Lz by using a temperature compensation and other driving members. Here, the AF or/and OIS correction may be corrected by using a first driving portion 141 with respect to the optical axis Lz direction and the X-axis and Y-axis directions.

Here, TTL of the camera module 1000 may be 9 mm or less, for example, in the range of 6 mm to 9 mm, and BFL may be in a range of 10% to 22% of the TTL. For example, BFL may range from 0.7 mm to 2 mm within the camera module 1000. BFL may move up to 0.2 mm when the lens closest to the image sensor 192 expands or contracts. That is, when the fourth lens 117 closest to the image sensor 192 is contracted, the optical axis distance (BFL) between the sensor-side surface of the fourth lens 117 and the image sensor 192 may be reduced to a maximum of 0.1 mm in an object-side direction, and when the fourth lens 117 is expanded, an optical axis distance (BFL) between the sensor-side surface of the fourth lens 117 and the image sensor 192 may be increased to a maximum of 0.1 mm in a sensor-side direction. Therefore, when the temperature correction amount by the first driving portion 141 is x, the temperature correction amount may be adjusted to the range (unit: mm) of −0.1≤x≤0.1.

When the temperature of the device to which the camera module 1000 is applied is a minimum of −40 degrees and a maximum of 100 degrees, and the temperature correction amount satisfies −0.1≤x≤0.1 and unit mm, it may be obtained from Table 1 below, the reference temperature may be set at 20 degrees, and it may be seen that there is no change in BFL at the reference temperature.

Table 1 is a table showing BFL correction rate according to the ambient temperature of the camera module 1000.

TABLE 1

| Temperature (° C.) | Max (%) | Min (%) |
|---|---|---|
| −40 | −5.0% | −14.3% |
| 20 | 0% | 0% |
| 100 | 14.3% | 5.0% |

As shown in Table 1, when the ambient temperature of the camera module 1000 is the reference temperature (e.g., 20 degrees), the correction rate is 0, and when the temperature is the lowest temperature (−40 degrees), the correction rate of the BFL is up to −5% and may be moved to at least −14.3%. When the temperature is the highest (100 degrees), the correction rate of BFL is a maximum of 14.3% and may be shifted to a minimum of 5%. Here, the value with the correction rate of negative (−1) is a value that moves in a direction in which the BFL decreases by driving the first driving portion 141 or the second driving portion 151 because the last lens contracts and the reference BFL increases. The value with a positive correction rate is a value that moves in a direction in which the BFL increases by driving the first driving portion 141 or the second driving portion 151 since the last lens is expanded and the reference BFL is reduced. According to this temperature change, the ambient temperature of the camera module 1000 is detected, the BFL is calculated by predicting the degree of expansion or contraction of the last lens 117 due to the detected ambient temperature, and the position of the first driving portion 141 or the second driving portion 151 may be changed so that the calculated BFL may become a reference BFL.

Table 2 is a table showing the BFL change amount at the minimum temperature and the maximum temperature when the reference BFL is 0.7 mm in an embodiment of the invention, the effective focal length (EFL) change amount, the total BFL change amount of the camera module 1000, and the position of the corrected driving portion. At this time, at least one or both of the first and second lens holders are made of aluminum, and the coefficient of thermal expansion (CTE) is 23.6.

TABLE 2

| Temperature (° C.) | Optical BFL change (μm) | EFL (mm) | Total BFL change amount (μm) | Position of corrected driving portion (mm) | Correction rate |
|---|---|---|---|---|---|
| −40 | −93.1 | 4.8686 | −100.0 | 0.6 | −14.3% |
| 20 | 0.0 | 4.9946 | 0.0 | 0.7 | 0 |
| 100 | 90.4 | 5.0956 | 100.0 | 0.8 | 14.3% |

In Table 2, the optical BFL change amount is an actual changed BFL value when the reference BFL is 1.8 mm and the temperature is minimum and maximum, and may be changed to a minimum of −93.1 μm and a maximum of 90.4 μm. Accordingly, the total change in BFL of the camera module 1000 may be set to a maximum of ±100 μm, and the correction rate may be set from a minimum of −14.3% to a maximum of 14.3%.

Table 3 is a table showing the BFL change amount at the minimum temperature and the maximum temperature when the reference BFL is 2 mm, the effective focal length (EFL) change amount, the total BFL change amount of the camera module 1000, and the corrected BFL position in an embodiment of the invention. At this time, at least one or both of the first and second lens holders are made of aluminum, and the coefficient of thermal expansion (CTE) is 23.6.

TABLE 3

| Temperature (° C.) | Optical BFL change (μm) | EFL (mm) | Total BFL change amount (μm) | Position of corrected driving portion (mm) | Correction rate |
|---|---|---|---|---|---|
| −40 | −93.1 | 4.8686 | −100.0 | 1.9 | −5.0% |
| 20 | 0.0 | 4.9946 | 0.0 | 2.0 | 0 |
| 100 | 90.4 | 5.0956 | 100.0 | 2.1 | 5.0% |

In Table 3, the optical BFL change amount is the actual changed BFL value when the reference BFL is 1.8 mm and the temperature is minimum and maximum, and may be changed to a minimum of −93.1 μm and a maximum of 90.4 μm. Accordingly, the total change in BFL of the camera module 1000 may be set to a maximum of ±100 μm, and the correction rate may be set from a minimum of −5.3% to a maximum of 5.3%. At this time, at least one or both of the first and second lens holders are made of aluminum, and the coefficient of thermal expansion (CTE) is 23.6.

Table 4 is a table showing the BFL change amount at the minimum temperature and the maximum temperature when the reference BFL is 1.8 mm, the effective focal length (EFL) change amount, the total BFL change amount of the camera module 1000, and the corrected BFL position in an embodiment of the invention. At this time, at least one or both of the first and second lens holders are made of aluminum, and the coefficient of thermal expansion (CTE) is 23.6.

TABLE 4

| Temperature (° C.) | Optical BFL change (µm) | EFL (mm) | Total BFL change amount (µm) | Position of corrected driving portion (mm) | Correction rate |
|---|---|---|---|---|---|
| −40 | −93.1 | 4.8686 | −100.0 | 1.7 | −5.56% |
| 20 | 0.0 | 4.9946 | 0.0 | 1.8 | 0.00% |
| 100 | 90.4 | 5.0956 | 100.0 | 1.9 | 5.56% |

In Table 4, the optical BFL change amount is the actual changed BFL value when the reference BFL is 1.8 mm and the temperature is minimum and maximum, and may change to a minimum of −93.1 µm and a maximum of 90.4 µm. Accordingly, the total change in BFL of the camera module 1000 may be set to a maximum of ±100 µm, and the correction rate may be set from a minimum of −5.3% to a maximum of 5.3%. And, the coefficient of thermal expansion (CTE) of the final lens material is 23.6.

The position of the corrected driving portion in Tables 2 to 4 is the position between the mover of the first driving portion 141 mounted around the second lens holder and the image sensor when corrected to the reference BFL by increasing or decreasing the BFL. This value represents the optical axis distance.

Table 5 and FIG. 8 are tables showing the correction distance according to temperature, that is, the correction rate within the range of 10 µm to 90 µm when the reference BFL is any one of the ranges of 0.7 mm to 2 mm.

TABLE 5

| Reference BFL (mm) | 10 µm | 20 µm | 30 µm | 40 µm | 50 µm | 60 µm | 70 µm | 80 µm | 90 µm |
|---|---|---|---|---|---|---|---|---|---|
| 0.7 | 1.43% | 2.86% | 4.29% | 5.71% | 7.14% | 8.57% | 10.00% | 11.43% | 12.86% |
| 0.8 | 1.25% | 2.50% | 3.75% | 5.00% | 6.25% | 7.50% | 8.75% | 10.00% | 11.25% |
| 0.9 | 1.11% | 2.22% | 3.33% | 4.44% | 5.56% | 6.67% | 7.78% | 8.89% | 10.00% |
| 1 | 1.00% | 2.00% | 3.00% | 4.00% | 5.00% | 6.00% | 7.00% | 8.00% | 9.00% |
| 1.1 | 0.91% | 1.82% | 2.73% | 3.64% | 4.55% | 5.45% | 6.36% | 7.27% | 8.18% |
| 1.2 | 0.83% | 1.67% | 2.50% | 3.33% | 4.17% | 5.00% | 5.83% | 6.67% | 7.50% |
| 1.3 | 0.77% | 1.54% | 2.31% | 3.08% | 3.85% | 4.62% | 5.38% | 6.15% | 6.92% |
| 1.4 | 0.71% | 1.43% | 2.14% | 2.86% | 3.57% | 4.29% | 5.00% | 5.71% | 6.43% |
| 1.5 | 0.67% | 1.33% | 2.00% | 2.67% | 3.33% | 4.00% | 4.67% | 5.33% | 6.00% |
| 1.6 | 0.63% | 1.25% | 1.88% | 2.50% | 3.13% | 3.75% | 4.38% | 5.00% | 5.63% |
| 1.7 | 0.59% | 1.18% | 1.76% | 2.35% | 2.94% | 3.53% | 4.12% | 4.71% | 5.29% |
| 1.8 | 0.56% | 1.11% | 1.67% | 2.22% | 2.78% | 3.33% | 3.89% | 4.44% | 5.00% |
| 1.9 | 0.53% | 1.05% | 1.58% | 2.11% | 2.63% | 3.16% | 3.68% | 4.21% | 4.74% |
| 2 | 0.50% | 1.00% | 1.50% | 2.00% | 2.50% | 3.00% | 3.50% | 4.00% | 4.50% |

As shown in Table 5, the correction rate for each reference BFL (e.g., in the range of 0.7 mm to 2 mm) and the correction distance (e.g., in the range of 10 µm to 90 µm) according to temperature may be stored in the storage portion 215. The temperature compensation portion 211 may control the BFL to become the reference BFL by increasing or decreasing the BFL through temperature compensation based on the detected temperature and the correction distance for each reference EFL.

As shown in the table in FIG. 6, from the lowest temperature to the maximum temperature is divided into a plurality of sections (Status 1-status 8), a temperature range of ±10 degrees is set based on the reference temperature for each section, and when the temperature correction rate for each section is expressed as an absolute value when it is −40 degrees, it may be corrected in the range of 5% to 14.3% because it is a reference value when it is 20 degrees, and there is no correction because it is a reference value when it is 20 degrees, and when it is expressed as an absolute value when it is the maximum of 100 degrees, it may be set as 5% to 14.3%. The temperature correction table for each section may be stored in the storage portion 215.

As shown in FIG. 7, in an embodiment of the invention, the first or second driving portions 141 and 151 may be maintained at a constant reference BFL by driving the first or second driving units 141 and 151 to increase or decrease the BFL according to a temperature change or a BFL change of the last lens 117 within a region connecting a minimum of −5% point and a maximum of −14.3% point when the temperature is at a minimum of −40 degrees, and a minimum of −5% point and a maximum of −14.3% point when the temperature is at a maximum of 100 degrees. Accordingly, a change in optical performance of the camera module according to a temperature change may be suppressed.

FIGS. 3 and 4 are diagrams for explaining the detailed configuration of the first driving portion in the camera system of FIG. 1, and FIG. 5 is a diagram for explaining the detailed configuration of the second driving portion 151, and the structure of each lens is schematically shown, and redundant description will be omitted.

Referring to FIG. 3, the lenses L1 and L2 of the first lens holder 101 and the lens L3 of the second lens holder 103 may be aligned along the optical axis Lz. A housing 105 is disposed outside the second lens holder 103, and the housing 105 may extend outside the first lens holder 101 on the main substrate 190. The first driving portion 141 may adjust the optical axis distance (BFL) between the internal lens L3 of the second lens holder 103 and the image sensor 192. The first driving portion 141 may include a first actuator 141A and a second actuator 141B disposed on opposite sides. The first and second actuators 141A and 141B may include a magnet 41 and a coil 42, and the magnet 41 is coupled to both sides of the second lens holder 103, and the coil 42 is disposed inside the housing 105 and may be disposed opposite to the magnets 41 disposed on both sides of the second lens holder 103, respectively.

The first and second actuators 141A and 141B may include a spring member 45 that connects and supports the second lens holder 103 and the housing 105. The spring member 45 may be connected between the upper or/and lower end of the second lens holder 103 and the housing 105. The spring member 45 may be implemented as a line spring or a leaf spring, and when the second lens holder moves in the direction of the optical axis Lz, it inhibits the second lens holder from leaving the optical axis Lz and supports it. A Hall sensor (not shown) may be included inside each coil 42, and the Hall sensor may be a position sensor for setting the position of the moving coil 42. Additionally, the first and second actuators 141A and 141B may include a yoke (not shown) outside each of the coils 42.

When a control signal is input based on the temperature detected by the temperature compensation portion 211, the first and second actuators 141A and 141B are operated by electromagnetic influence between the coil 42 and the magnet 41. The magnets 41 move up or down together with the second lens holder 103 in the direction of the optical axis Lz. At this time, the spring member 45 supports movement of the second lens holder 103 in the optical axis Lz direction, and the optical axis distance BFL between the lens L3 of the second lens holder 103 and the image sensor 192 increases or decreases. Therefore, the distance (BFL) between the last lens L3 of the second lens holder 103 and the image sensor 192 may be maintained constant even when the last lens L3 expands or contracts due to temperature. Accordingly, the camera module 1000 may suppress changes in optical performance even when the temperature varies due to the above configuration.

As shown in FIG. 4, the first driving unit 141 may include first and second actuators 141A and 141B, and the first and second actuators 141A and 141B may include ball bearings 48 disposed between both sides of the second lens holder 103 and the inside of the housing 105. A plurality of ball bearings 48 may be disposed on both sides of the second lens holder 103, and when the second lens holder 103 moves in the optical axis direction Lz, the second lens holder 103 may be guided in the optical axis direction. The ball bearing 48 may inhibit the second lens holder 103 from being separated in different axial directions.

When a control signal is input based on the temperature detected by the temperature compensation portion 211, in the first and second actuators 141A and 141B, the magnets 41 move up or down together with the second lens holder 103 in the optical axis Lz direction by an electromagnetic influence between the coil and the magnet. In this case, the ball bearing 48 guides the movement of the second lens holder 103, and the optical axis distance BFL between the lens L3 of the second lens holder 103 and the image sensor 192 increases or decreases. Accordingly, the distance BFL between the last lens L3 of the second lens holder 103 and the image sensor 192 may be constantly maintained even when the last lens L3 expands or contracts due to the temperature. Accordingly, the camera module 1000 may suppress a change in optical performance even though the temperature is changed due to the above configuration.

Referring to FIG. 5, the second driving portion 151 may include first and second actuators 151A and 151B. The first and second actuators 151A and 151B may include a magnet 51, a coil 52, and a spring member 55. The magnet 51 may be disposed on both sides or the lower side of the main substrate 190, and the coil 52 may be disposed under the housing 105. The housing 105 further includes an extension support portion 105A to the outside, and the extension support portion 105A may protect the bottom portion where the coil 52 and the magnet 51 are disposed.

Here, the lenses L1-L3 of the camera module 1000 may be coupled to the first lens holder 101 or to different lens holders. Additionally, any one of the different lens holders may be moved for AF or/and OIS operation. The lower end 101A of the first lens holder 101 is separately coupled to inhibit the last lens L3 or/and optical filter from being separated after the last lens L3 or/and optical filter is coupled.

When a control signal is input based on the temperature detected by the temperature compensation portion 211, the first and second actuators 151A and 151B of the second driving portion 151 operate the coil 52 and the magnet 51. The magnets 51 move up or down together with the main substrate 190 in the direction of the optical axis Lz due to electromagnetic influence between them. At this time, the spring member 55 guides the movement of the main substrate 190, and the optical axis distance BFL between the image sensor 192 disposed on the main substrate 190 and the last lens L3 increases or decreases. Accordingly, the optical axis distance (BFL) between the image sensor 192 and the last lens L3 may be maintained constant even when the last lens L3 expands or contracts due to temperature. Accordingly, the camera module 1000 may suppress changes in optical performance even when the temperature varies due to the above configuration. Although the third driving portion 161 is not separately shown in the embodiment of the invention, it may be implemented as a plurality of actuators having magnets, coils, and support members (springs or ball bearings), but is not limited thereto.

The camera system according to an embodiment of the invention predicts and calculates the temperature detected by the temperature sensor 213 and the change in BFL by the temperature compensation portion 211, and the movement amount of the actuator of the first driving portion 141 or the second driving portion 151 may be corrected within the region of FIG. 7 by a control signal for compensation with the reference BFL.

Figure 9:
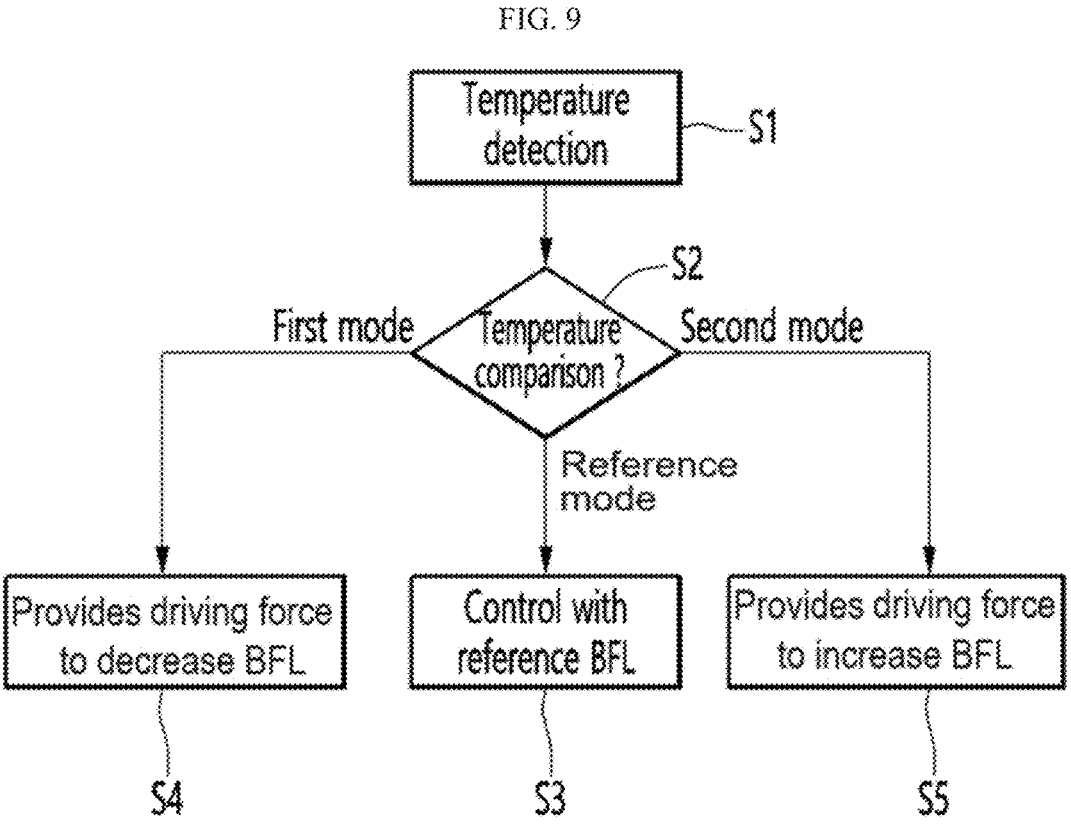
FIG. 9 is a graph showing a method of correcting the focal distance according to temperature in the camera system of FIG. 1.

Referring to FIGS. 9 and 1, the BFL compensation method by the temperature compensation portion 211 detects an ambient temperature of the camera module 100 by the temperature sensor 213 (S1), and compares and matches the detected ambient temperature with a temperature compensation table stored in the storage portion 215 (S2). At this time, when the ambient temperature is in the reference mode, it is controlled to maintain the reference BFL (S3), and when the first temperature is lower than the reference temperature, the driving force is provided to the first or second driving portions 141 and 151 of the camera module to decrease the BFL (S4), and when the second temperature is higher than the reference temperature, the step S5 of providing the driving force to the first or second driving portions 141 and 151 of the camera module to increase the BFL may be performed.

The camera module according to an embodiment of the invention can also be applied to an ADAS camera module of 100 degrees or less, a wide-angle camera module, and a DMS camera module. The ADAS (Advanced driving portion assistance system) camera module may have a TTL in the range of 15 mm to 45 mm, the wide-angle camera module may have a TTL in the 10 mm to 17 mm range, and the DMS (Driving portion monitoring system) camera module may have a TTL in the range of 8 mm to 12 mm. These camera modules may be calibrated in a range of 10% to 22% of TTL relative to the correction rate of BFL.

Figure 10:
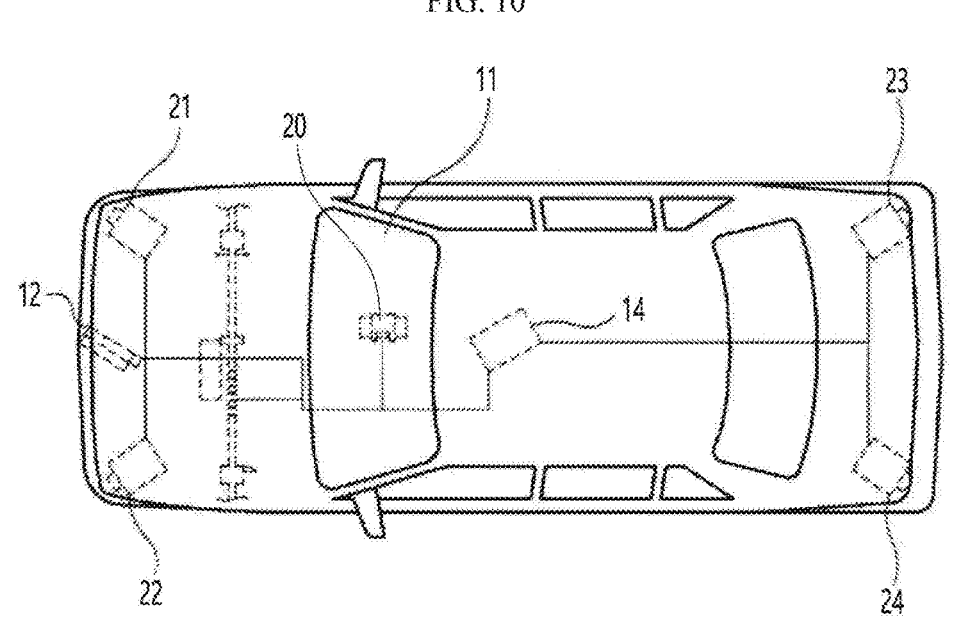
FIG. 10 is an example of a vehicle to which a camera system according to an embodiment of the invention is applied.

Referring to FIG. 10, the vehicle camera system according to an embodiment of the invention includes an image generator 11, a first information generator 12, a second information generators 21, 22, 23, 24, and a control unit 14. At least one of the image generator 11, the first information generator 12, and the second information generators 21, 22, 23, and 24 may control by the camera module 1000 and the temperature compensation portion 211 disclosed in the embodiment.

The image generator 11 may include at least one camera disposed in the host vehicle, and may generate a front image of the host vehicle by photographing the front of the host vehicle.

Additionally, the image generator 11 may generate an image surrounding the host vehicle by photographing not only the front of the host vehicle but also the surroundings of the host vehicle in one or more directions. Here, the front image and peripheral image may be digital images and may include color images, black-and-white images, and infrared images. Additionally, the front image and surrounding image may include still images and moving images. The image generator 11 provides the driving portion image, front image, and surrounding image to the control unit 14. Next, the first information generator 12 may include at least one radar or/and a camera disposed in the host vehicle, and generates first detection information by detecting the front of the host vehicle. Specifically, the first information generator 12 is disposed in the host vehicle and generates first detection information by detecting the location and speed of vehicles located in front of the host vehicle and the presence and location of pedestrians.

The first detection information generated by the first information generator 12 may be used to control the distance between the own vehicle and the vehicle in front to be kept constant, and when the driving portion wants to change the driving lane of the own vehicle or reverse parking. The stability of vehicle operation may be improved in certain preset cases, such as when driving. The first information generator 12 provides first detection information to the control unit 14. Subsequently, the second information generators 21, 22, 23, and 24 generate second sensing information by sensing each side of the host vehicle based on the front image generated by the image generator 11 and the first sensing information generated by the first information generator 12. Specifically, the second information generators 21, 22, 23, and 24 may include at least one radar or/and camera disposed in the host vehicle, and may detect the location and speed of vehicles located on the side of the host vehicle or take an image. Here, the second information generators 21, 22, 23, and 24 may be disposed on both sides of the front and rear sides of the host vehicle, respectively.

This vehicle camera system may protect vehicles and objects from automatic driving or surrounding safety by providing or processing information acquired through the front, rear, each side, or corner regions of the vehicle to the user.

Features, structures, effects, etc. described in the above embodiments are included in at least one embodiment of the invention, and are not necessarily limited to only one embodiment. Furthermore, features, structures, effects, etc. illustrated in each embodiment may be combined or modified for other embodiments by those of ordinary skill in the art to which the embodiments belong. Accordingly, the contents related to such combinations and modifications should be interpreted as being included in the scope of the invention.

In addition, although the embodiment has been described above, it is only an example and does not limit the invention, and those of ordinary skill in the art to which the invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. A camera system comprising:
   a camera module having an image sensor, a first lens holder having at least one lens, a second lens holder disposed between the image sensor and the first lens holder and having a first lens adjacent to the image sensor, and a driving portion that moves the second lens holder in an optical axis direction;
   a temperature sensor that detects an ambient temperature of the camera module;
   a storage portion storing a correction rate of an optical axis distance between the first lens and the image sensor according to the ambient temperature; and
   a temperature compensation portion that drives the driving portion using the ambient temperature and the correction rate of the storage portion to adjust the optical axis distance between the first lens and the image sensor,
   wherein the first lens is made of plastic,
   wherein the temperature compensation portion decreases or increases the optical axis distance between the first lens and the image sensor, which is changed by contraction or expansion of the first lens according to the temperature detected by the temperature sensor,
   wherein the optical axis distance between the first lens and the image sensor is back focal length (BFL),
   wherein an optical axis distance between the image sensor and an object-side surface of a lens closest to a subject within the camera module is total track length (TTL), and
   wherein BFL is changed within a range of 10% to 22% of TTL according to the detected temperature change.

2. The camera system of claim 1,
   wherein the second lens holder is made of metal,
   wherein the driving portion includes a plurality of actuators having opposing coils and magnets.

3. The camera system of claim 2,
   wherein the camera module includes a housing disposed outside the image sensor, a cover glass between the image sensor and the plurality of lenses, and an optical filter between the cover glass and the plurality of lenses,
   wherein a coil of the driving portion is coupled to the housing.

4. The camera system of claim 1,
   wherein the temperature compensation portion drives the driving portion to correct the optical axis distance between the first lens and the image sensor to decrease when the temperature is detected to be lower than a reference temperature.

5. The camera system of claim 1,
   wherein the temperature compensation portion drives the driving portion to correct the optical axis distance between the first lens and the image sensor to increase when the temperature is detected to be higher than a reference temperature.

6. The camera system of claim 1,
   wherein a position of a mover of the driving portion is moved by 0.1 mm in an object-side direction or 0.1 mm in a sensor-side direction from a reference position by the temperature compensation portion.

7. The camera system of claim 1, wherein the correction rate is corrected in an object-side direction or in a sensor-side direction in a range of 5% to 14.3% from a reference BFL.

8. The camera system of claim 7, wherein the detected temperature ranges from a minimum of −40 degrees to a maximum of 100 degrees, wherein the reference BFL is an optical axis distance at a reference temperature where the detected temperature is 20±10 degrees, wherein the reference BFL ranges from 0.7 mm to 2 mm, wherein the temperature compensation portion moves the first lens by 0.1 mm in the object-side direction or 0.1 mm in the sensor-side direction when the temperature changes from the reference temperature to the minimum or maximum temperature.

9. The camera system of claim 1, wherein the lens closest to the subject in the camera module is made of glass.

10. A camera system comprising:

a camera module having a first lens holder having a plurality of lenses, a main substrate, an image sensor disposed on the main substrate, and a driving portion that moves the main substrate in an optical axis direction;

a temperature sensor that detects the ambient temperature of the camera module;

a storage portion storing a correction rate of an optical axis distance between the image sensor and a first lens adjacent to the image sensor among the plurality of lenses according to the ambient temperature; and a temperature compensation portion that drives the driving portion using the ambient temperature and the correction rate of the storage portion to adjust the optical axis distance between the first lens and the image sensor, wherein the first lens is made of plastic, wherein the temperature compensation portion decreases or increases the optical axis distance between the first lens and the image sensor, which is changed by contraction or expansion of the first lens according to the temperature detected by the temperature sensor.

11. The camera system of claim 10, wherein the driving portion includes a plurality of actuators having opposing coils and magnets.

12. The camera system of claim 11, wherein the camera module includes a housing disposed outside the image sensor, a cover glass between the image sensor and the plurality of lenses, and an optical filter between the cover glass and the plurality of lenses, wherein the coil of the driving portion is coupled to the housing.

13. The camera system of claim 10, wherein the temperature compensation portion drives the driving portion to correct the optical axis distance between the first lens and the image sensor to decrease when the temperature is detected to be lower than a reference temperature.

14. The camera system of claim 10, wherein the temperature compensation portion drives the driving portion to correct the optical axis distance between the first lens and the image sensor to increase when the temperature is detected to be higher than a reference temperature.

15. The camera system of claim 10, wherein a position of a mover of the driving portion is moved by 0.1 mm in an object-side direction or 0.1 mm in a sensor-side direction from a reference position by the temperature compensation portion.

16. The camera system of claim 10, wherein an optical axis distance between the first lens and the image sensor is back focal length (BFL), wherein an optical axis distance between the image sensor and an object-side surface of a lens closest to a subject within the camera module is total track length (TTL), and wherein BFL is changed within a range of 10% to 22% of TTL according to the detected temperature change.

17. The camera system of claim 16, wherein the correction rate is corrected in an object-side direction or in a sensor-side direction in a range of 5% to 14.3% from a reference BFL.

18. The camera system of claim 16, wherein the detected temperature ranges from a minimum of −40 degrees to a maximum of 100 degrees, wherein the reference BFL is an optical axis distance at a reference temperature where the detected temperature is 20±10 degrees, wherein the reference BFL ranges from 0.7 mm to 2 mm, wherein the temperature compensation portion moves the first lens by 0.1 mm in the object-side direction or 0.1 mm in the sensor-side direction when the temperature changes from the reference temperature to the minimum or maximum temperature.

19. The camera system of claim 16, wherein a weight of the first lens or a lens group having the first lens is 0.6 g or less.

20. The camera system of claim 16, wherein the lens closest to the subject in the camera module is made of glass.

* * * * *